US012344026B2

(12) United States Patent
Lemay et al.

(10) Patent No.: US 12,344,026 B2
(45) **Date of Patent: *Jul. 1, 2025**

(54) MOISTURE-ERASABLE NOTE TAKING SYSTEM

(71) Applicant: Rocket Innovations, Inc., Boston, MA (US)

(72) Inventors: Joseph Lemay, Marblehead, MA (US); Jacob Epstein, Concord, MA (US)

(73) Assignee: Rocket Innovations, Inc., Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/415,354

(22) Filed: Jan. 17, 2024

(65) Prior Publication Data

US 2024/0227429 A1 Jul. 11, 2024

Related U.S. Application Data

(63) Continuation of application No. 18/075,062, filed on Dec. 5, 2022, now Pat. No. 11,884,094, which is a (Continued)

(51) Int. Cl.
*B43L 1/00* (2006.01)
*B42D 1/00* (2006.01)

(52) U.S. Cl.
CPC ................ *B43L 1/00* (2013.01); *B42D 1/008* (2013.01); *B42P 2241/18* (2013.01); *B42P 2241/26* (2013.01)

(58) Field of Classification Search
CPC ............................... B43L 1/00; B42P 2241/18

(Continued)

(56) References Cited

U.S. PATENT DOCUMENTS 4,028,118 A 6/1977 Nakasuji et al.
4,349,639 A 9/1982 Muller (Continued)

FOREIGN PATENT DOCUMENTS

CN 2249172 Y 3/1997
CN 2878069 Y 3/2007

(Continued)

OTHER PUBLICATIONS

Amazon page Rocketbook Core Reusable Smart Notebook, https://www.amazon.com/dp/B06ZXWVZ3X/ref=enc_b_5_t?th=1 (accessed: Dec. 5, 2023).

(Continued)

*Primary Examiner* — Kurt Fernstrom

(74) *Attorney, Agent, or Firm* — Nutter McClennen & Fish LLP

(57) ABSTRACT

A method of reusing a notebook provides a notebook having a synthetic-paper page. The method also provides a thermochromic ink pen which, when used to write on the synthetic paper page, leaves thermochromic ink markings. The method further provides a moisture carrier configured to have a liquid diffused therein. The moisture carrier is configured to erase the thermochromic ink markings from the synthetic-paper page by contacting the thermochromic ink markings when the moisture carrier is moist. The method then writes with thermochromic ink on at least a portion of the synthetic-paper page. Liquid is diffused in the moisture carrier, and the portion of the synthetic-paper page having the thermochromic ink is wiped with the moist moisture carrier, such that the thermochromic ink is erased from the synthetic-paper page.

9 Claims, 12 Drawing Sheets

Related U.S. Application Data continuation of application No. 16/876,717, filed on May 18, 2020, now Pat. No. 11,541,683, which is a continuation of application No. 16/839,839, filed on Apr. 3, 2020, now Pat. No. 11,001,094, which is a continuation of application No. 16/354,711, filed on Mar. 15, 2019, now Pat. No. 10,618,345, which is a continuation of application No. 15/811,360, filed on Nov. 13, 2017, now Pat. No. 10,232,663.

(60) Provisional application No. 62/421,335, filed on Nov. 13, 2016.

(58) Field of Classification Search
USPC .................... 434/408, 413, 414; 283/67, 72; 401/196; 428/29; 446/14
See application file for complete search history.

(56) References Cited

U.S. PATENT DOCUMENTS

| | | | |
|---|---|---|---|
| 4,421,560 | A | 12/1983 | Kito et al. |
| 4,425,161 | A | 1/1984 | Shibahashi et al. |
| 4,720,301 | A | 1/1988 | Kito et al. |
| 4,936,916 | A | 6/1990 | Shinmitsu et al. |
| 4,943,088 | A | 7/1990 | Wada |
| 5,380,394 | A | 1/1995 | Shibuya et al. |
| 5,786,838 | A | 7/1998 | Steinhauser |
| 6,346,024 | B1 | 2/2002 | Engel |
| 8,092,866 | B2 | 1/2012 | Parr |
| 8,616,797 | B2 | 12/2013 | Kamitani |
| 9,345,270 | B2 | 5/2016 | Owen |
| 9,352,607 | B1 | 5/2016 | Albenda |
| 9,592,702 | B2 | 3/2017 | Wase |
| 9,844,965 | B1 | 12/2017 | Lemay |
| 10,232,663 | B2 | 3/2019 | Lemay et al. |
| 10,618,345 | B2 | 4/2020 | Lemay et al. |
| 11,001,094 | B2 | 5/2021 | Lemay et al. |
| 11,541,683 | B2 | 1/2023 | Lemay et al. |
| 11,884,094 | B2 | 1/2024 | Lemay et al. |
| 2003/0077563 | A1 | 4/2003 | Farmer |
| 2005/0175390 | A1 | 8/2005 | Wehmeyer |
| 2007/0082829 | A1 | 4/2007 | Smets et al. |
| 2007/0286971 | A1 | 12/2007 | Cooper et al. |
| 2010/0226708 | A1 | 9/2010 | Bogal |
| 2010/0275813 | A1 | 11/2010 | Kurihara et al. |
| 2011/0212421 | A1 | 9/2011 | Schwendimann et al. |
| 2012/0141188 | A1 | 6/2012 | Fujita |
| 2012/0328356 | A1 | 12/2012 | Ishii |
| 2013/0177703 | A1 | 7/2013 | Clayton et al. |
| 2013/0309650 | A1 | 11/2013 | Carney |
| 2015/0224814 | A1 | 8/2015 | Bouchard et al. |
| 2016/0096397 | A1 | 4/2016 | Wakefield |
| 2016/0250886 | A1 | 9/2016 | Albenda |
| 2018/0134068 | A1 | 5/2018 | Lemay et al. |
| 2019/0275829 | A1 | 9/2019 | Lemay et al. |
| 2020/0230999 | A1 | 7/2020 | Lemay et al. |

FOREIGN PATENT DOCUMENTS

| | | | |
|---|---|---|---|
| CN | 201702998 | U | 1/2011 |
| CN | 201728919 | U | 2/2011 |
| CN | 202319508 | U | 7/2012 |
| CN | 105856895 | A | 8/2016 |
| EP | 1327528 | A1 | 7/2003 |
| EP | 1743975 | A1 | 1/2007 |
| EP | 2581422 | A1 | 4/2013 |
| JP | H08224973 | A | 9/1996 |
| JP | H08244397 | A | 9/1996 |
| JP | 2011118875 | A | 6/2011 |
| JP | 2014113800 | A | 6/2014 |
| JP | 2016144933 | A | 8/2016 |
| WO | 2005005156 | A1 | 1/2005 |
| WO | 2014144853 | A2 | 9/2014 |
| WO | 2018089922 | A1 | 5/2018 |

OTHER PUBLICATIONS

Amazon review of Rocketbook, dated Nov. 8, 2017, https://www.amazon.com/gp/customer-reviews/R2CM150ADIJZPF/ref=cm_cr_arp_d_rvw_ttl?ie=UTF8&ASIN=B06ZXWVZ3X (accessed: Dec. 5, 2023).
European Patent Office, Notice of Opposition to European Patent EP 3538379, dated Dec. 15, 2023, 19 pages.
European Patent Office, Notice of Opposition to European Patent EP 3538379, dated Dec. 15, 2023, 31 pages.
FAQ on Rocketbook's official website, captured by the internet archive on Aug. 3, 2017 https://web.archive.org/web/20170803221538/https://getrocketbook.com/apps/FAQ#!how-do-i-erase-pages-in-my-everlast (accessed: Dec. 5, 2023).
Lee, L.H. "Microstructures and physical properties of synthetic and modified papers" in Applied Polymer Symposium, No. 23 167-179 (1974).
Pilot FriXion ball erasable gel pen, https://www.modulor.de/en/pilot-frixion-ball-erasable-gel-pen.html available on the internet archive: https://web.archive.org/web/20160603192924/https:/www.modulor.de/en/pilot-frixion-ball-erasable-gel-pen.html (archived on Jun. 3, 2016, accessed on Dec. 13, 2023).
Pilot FriXion official website, https://www.pilot-frixion.uk/uk/frixion-story/ (accessed Dec. 12, 2023), also available on the internet archive: https://web.archive.org/web/20230521000118/https://www.pilot-frixion.uk/uk/frixion-story/.
PrintWiki page "Ink Receptive" http://printwiki.org/Ink_Receptive (accessed: Dec. 8, 2023), also available on the internet archive: https://web.archive.org/web/20160605222228/http://printwiki.org/Ink_Receptive (archived on Jun. 5, 2016, accessed: Dec. 8, 2023).
PrintWiki page "Porosity" http://printwiki.org/Porosity (accessed: Dec. 7, 2023), also available on the internet archive: https://web.archive.org/web/20160605193032/http://printwiki.org/Porosity (archived on Jun. 5, 2016, accessed: Dec. 7, 2023).
Singh, Surenda, "Paper smoothness evaluation methods" BioResources 3(2), Apr. 9, 2008, pp. 503-516.
Stone paper, "Stone Paper Type S-ECO (RPD)—Technical Statistics" (last updated Jan. 1, 2014) Host: https://stone-paper.nl/downloads.
The Science Behind FriXion Erasable Pens, https://www.nippon.com/en/features/c00520/, Aug. 24, 2016, also available on the internet archive: https://web.archive.org/web/20160825171014/https://www.nippon.com/en/features/c00520/ (archived on Aug. 25, 2016, accessed on Dec. 12, 2023).
The Two Types of Erasable Ink and Why One is Much Cooler Than the Other—page internet https://www.mcgill.ca/oss/article/did-you-know-general-science/two-types-erasable-ink-and-why-one-much-cooler-other.
Title index of PrintWiki http://printwiki.org/Title_Index (accessed: Dec. 7, 2023), also available on the internet archive: https://web.archive.org/web/20161031001129/http://printwiki.org/Title_Index (archived on Oct. 31, 2016, accessed: Dec. 7, 2023).
U.S. Appl. No. 62/421,335, filed Nov. 13, 2016 (14 pages).
Wikipedia page "Dye", version of 21:38, Oct. 14, 2016 https://en.wikipedia.org/w/index.php?title=Dye&oldid=744385285 (accessed: Dec. 7, 2023).
Wikipedia page "Leuco Dye", version of 14:36, Aug. 18, 2016 https://en.wikipedia.org/w/index.php?title=Leuco_dye&oldid=735086230 (accessed: Dec. 7, 2023).
YouTube video "Review: Elfinbook—Erasable, Smart Notebook Journal", https://www.youtube.com/watch?v=R343mE_VLwg (dated May 23, 2017, accessed Dec. 6, 2023), also available on the internet archive https://web.archive.org/web/20190603091358/https://www.youtube.com/watch?v=R343mE_VKwg (captured on Jun. 3, 2019, accessed Dec. 6, 2023).
YouTube video "Rocketbook Everlast Letter Notebook with Pens", https://www.youtuve.com/watch?v=L3RpOGNuDy4 (dated Sep. 24, 2017, accessed Dec. 5, 2023).
YouTube video "Rocketbook Everlast Review | My New Favorite Tech!" (dated Jul. 2, 2018, accessed Dec. 6, 2023).
"Polyart: The Extraordinary Synthetic Paper", Oct. 19, 2013 [retrieved online Mar. 1, 2018].

(56) References Cited

OTHER PUBLICATIONS

"The Science Behind FriXion Erasable Pens", Aug. 24, 2016 [retrieved online Sep. 10, 2018].
[No Author Listed] EcoBook—reusable, biodegradable notebook, The first ever eco-friendly, reusable, biodegradable notebook. Available at https://www.indiegogo.com/projects/ecobook-reusable-biodegradable-notebook#/ on Sep. 16, 2020.
[No Author Listed] Esquoia. Available at https://esquoia.com/ on Sep. 16, 2020.
Campbell at al, "Demonstration of Thermodynamics and Kinetics Using FriXion Erasable Pens", J. Chem. Educ., 2012, 89 (4), pp. 526-528, Feb. 10, 2012[retrieved online Mar. 1, 2018].
Extended European Search Report for Application No. 17870191.8, issued Jun. 26, 2020 (12 pages).
Extended European Search Report for Application No. 22196255.8, dated Nov. 30, 2022, 10 pages.
Extended European Search Report for Application No. 22196256.6, dated Dec. 2, 2022, 11 pages.
Extended European Search Report for Application No. 22196257.4, dated Dec. 7, 2022, 8 pages.
Extended European Search Report for Application No. 22196258.2, dated Dec. 12, 2022, 10 pages.
International Searching Authority, International Search Report—International Application No. PCT/US17/61359, dated Jan. 30, 2018 together with the Written Opinion of the International Searching Authority, 14 pages.
Novak, I., "Esquoia Reusable Notebook." Jul. 23, 2014. Retrieved from the Internet under <https://www.youtube.com/watch?v=2BrvXE2AtZk> on Sep. 16, 2020.
Sparegrave, J., "Notebook review: The erasable, reusable Ecobook, a great idea to brainstorm." Feb. 28, 2016. Retrieved from the Internet under <https://www.youtube.com/watch?v=w1TkIMvhqal> on Sep. 16, 2020.

104

MOISTURE-ERASABLE NOTE TAKING SYSTEM

PRIORITY

This patent application is a continuation of U.S. patent application Ser. No. 18/075,062, filed Dec. 5, 2022, which is a continuation of U.S. patent application Ser. No. 16/876,717, filed May 18, 2020, which is a continuation of U.S. patent application Ser. No. 16/839,839, filed Apr. 3, 2020, issued May 11, 2021, as U.S. Pat. No. 11,001,094, which is a continuation of U.S. patent application Ser. No. 16/354,711, filed Mar. 15, 2019, issued Apr. 14, 2020, as U.S. Pat. No. 10,618,345, which is a continuation of U.S. patent application Ser. No. 15/811,360, filed Nov. 13, 2017, issued Mar. 19, 2019, as U.S. Pat. No. 10,232,663, which claims priority from U.S. provisional patent application No. 62/421,335, filed Nov. 13, 2016, each of which is incorporated herein by reference in their entirety.

FIELD OF THE INVENTION

The invention generally relates to a system for note taking and, more particularly, the invention relates to erasing notes with liquid.

BACKGROUND OF THE INVENTION

Notes are frequently taken using classic pen and paper systems. Students, for example, generally purchase new notebooks every new school year for various subject matters, and/or when a notebook is filled up. Pages of notebooks may go unused, and thus, trees and other natural resources are wasted. Attempts have been made to migrate to other note taking formats, such as digital tablet devices and reusable writing surfaces. Many users prefer the feel of writing with a writing instrument on paper, and thus, do not adjust well to the feel of taking notes with digital devices. Furthermore, many classroom environments do not allow the use of electronic devices. Additionally, reusable writing surfaces, such as whiteboards, may wipe off easily, causing difficulty with note storage and portability.

Thermochromic ink pens can be used to write on paper and can be effectively erased. Thermochromic ink typically changes from opaque (i.e., color) to transparent when heat is applied (e.g., due to friction from an eraser being rubbed on the ink, or when the paper with thermochromic ink is placed in an oven or microwave oven). One example of a thermochromic ink pen is the FRIXION™ thermochromic ink pen manufactured by Pilot Corporation. A description of the FRIXION™ thermochromic ink pen can be found in Miki, Masuda, The Science Behind Frixion Erasable Pens, http://www.nippon.com/en/features/c00520/ dated Aug. 24, 2016. Some exemplary thermochromic inks are described in U.S. Pat. Nos. 4,028,118, 4,720,301, 4,720,301, and 8,616,797.

Synthetic paper generally contains no wood pulp or natural fibers (as found in standard paper), and is commonly formed from polypropylene resin along with inorganic fibers, although many different types of synthetic papers were known (e.g., including different types of synthetic papers referred to as stone paper). Synthetic paper frequently has a base layer covered with a surface layer. Among other things, the base layer of synthetic paper may be formed, for example, polyethylene, polypropylene, high-density polyethylene, polyester, and other plastics. The surface layer adds a bright surface finish, high opacity and smooth texture. Synthetic-paper is also more durable that traditional paper.

Many synthetic papers are tear-resistant, wear-resistant, chemical-resistant, heat-resistant, and/or grease-resistant relative to traditional paper. This makes synthetic paper a good option for use in environments where the notebook could be damaged. For example, when used with many traditional pens and markers, notes and/or publications written on synthetic paper may be read in the bath, pool, spa, shower, or while boating, fishing, skiing, snowmobiling or scuba diving.

SUMMARY OF VARIOUS EMBODIMENTS

In accordance with one embodiment of the invention, a method of reusing a notebook provides a notebook having a synthetic-paper page. The method also provides a thermochromic ink pen which, when used to write on the synthetic paper page, leaves thermochromic ink markings. The method further provides a moisture carrier configured to have a liquid diffused therein. The moisture carrier is configured to erase the thermochromic ink markings from the synthetic-paper page by contacting the thermochromic ink markings when the moisture carrier is moist. The method then writes with thermochromic ink on at least a portion of the synthetic-paper page. Liquid is diffused in the moisture carrier, and the portion of the synthetic-paper page having the thermochromic ink is wiped with the moist moisture carrier, such that the thermochromic ink is erased from the synthetic-paper page.

Among other pens, the thermochromic ink pen may be a FRIXION™ thermochromic ink pen. Among other types of synthetic paper, the synthetic paper may be Polyart®, Appvion Appleton Digital™, Parax™ stone paper, RockStock™ stone paper, Nekoosa™ XM, Nekoosa™ OM, HopSyn DL Grade®, and/or Yupo® FPG 80. The synthetic-paper page may have a base layer and a surface layer disposed over the base layer. Among other things, the moisture carrier may be a cloth, a sponge, a napkin, a paper towel, and/or a baby-wipe.

The liquid diffused in the moisture carrier may be water and/or isopropyl alcohol. In some embodiments, the liquid diffused in the moisture carrier does not damage the surface layer of the synthetic-paper page when the synthetic-paper page is wiped to erase the thermochromic ink. In some embodiments, the surface layer is formed from calcium carbonate.

In accordance with an embodiment of the invention, a system includes a notebook having a synthetic-paper page and a thermochromic ink pen. The thermochromic ink pen may be used to write on the synthetic-paper page. Writing on the page leaves thermochromic ink markings. In some embodiments, the system includes a moisture carrier configured to have a liquid diffused therein. The moisture carrier erases the thermochromic ink markings from the synthetic-paper page by contacting the thermochromic ink markings when the liquid is diffused in the moisture carrier.

In accordance with another embodiment of the invention, a method of reusing a notebook having a synthetic-paper page provides a notebook having a synthetic-paper page including thermochromic ink markings on at least a portion of the synthetic-paper page. The method also wipes the portion of the synthetic-paper page having the thermochromic ink with a moistened moisture carrier, such that the thermochromic ink is erased from the synthetic-paper page.

In some embodiments, the moisture carrier is a pre-moistened moisture carrier, for example, a wet-wipe or an isopropyl alcohol wipe. In some other embodiments, the moisture carrier is provided as a dry moisture carrier, for example, a dry cloth or paper towel.

In accordance with yet another illustrative embodiment, a method reuses a notebook having a synthetic-paper page. The method provides a notebook having a synthetic-paper page, the page having thermochromic ink markings on at least a portion of the synthetic-paper page. The portion of the synthetic-paper page having thermochromic ink is wiped with a moistened moisture carrier, such that the thermochromic ink is erased from the synthetic-paper page.

In some embodiments, the method writes with thermochromic ink on at least a portion of the synthetic paper page.

In accordance with yet another illustrative embodiment, a reusable notebook for use with heat-erasable ink includes a binding configured to hold a plurality of pages. The notebook also includes at least one cover, and a plurality of pages that are moisture resistant. The pages are configured to be written on with heat-erasable ink that is moisture-erasable. In some embodiments, the pages are Polyart®, Appvion Appleton Digital™, Parax™ stone paper, RockStock™ stone paper, Nekoosa™ XM, Nekoosa™ OM, HopSyn DL Grade®, and/or Yupo® FPG 8 paper pages.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

As discussed above, thermochromic ink pens are generally used to write indelibly on paper, but with the ability to effectively erase thermochromic ink markings through the application of heat that changes the ink from opaque to transparent. Also as discussed above, synthetic paper can be used to protect writings in harsh environments such as from moisture.

In illustrative embodiments, a system provides a notebook with synthetic-paper pages and a thermochromic ink pen. A user writes on the pages of the notebook with the thermochromic ink pen, such as, for example, a FRIXION™ thermochromic ink pen manufactured by Pilot Corporation. When the user has finished taking notes and wishes to erase them, the user may erase the notes by wiping the notes off of the page with a moisture carrier (e.g., a cloth, sponge, or paper towel) moistened with water or other appropriate liquid (e.g., alcohol). Details of illustrative embodiments are discussed below.

Figure 1:
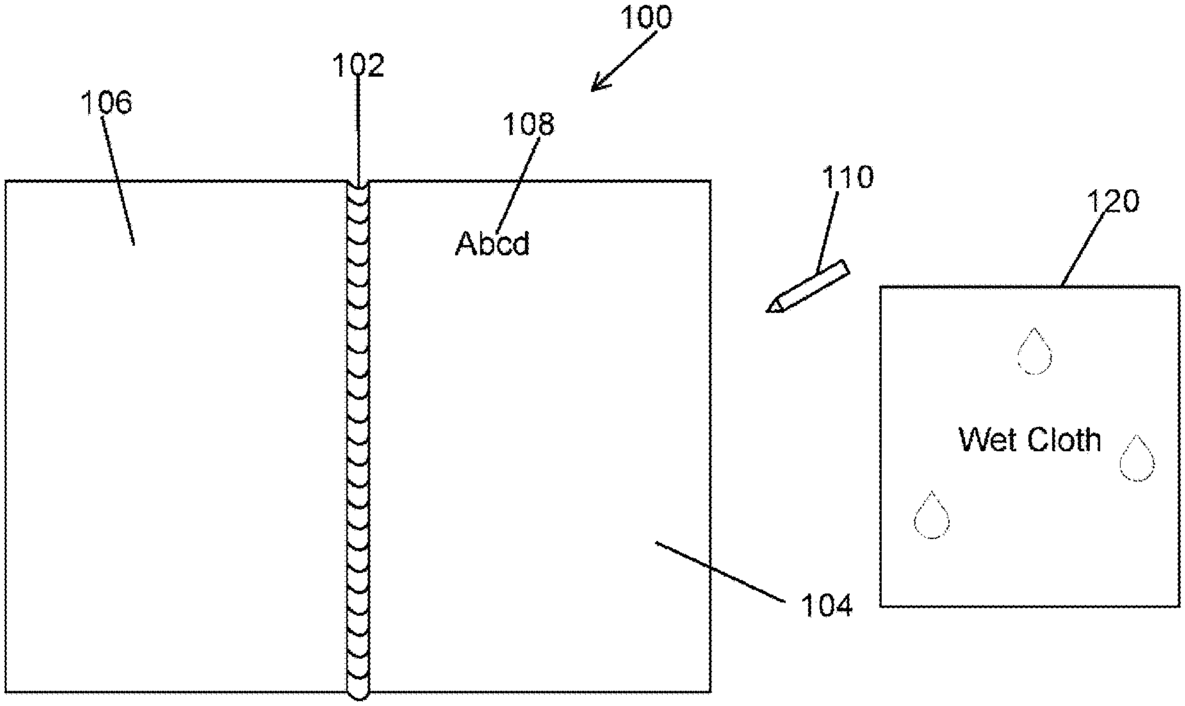
FIG. 1 schematically shows an erasable writing system in accordance with illustrative embodiments of the invention.

FIG. 1 schematically shows an erasable writing system in accordance with illustrative embodiments of the invention. In accordance with one embodiment of the invention, the system includes a notebook 100 having synthetic-paper pages 104. Like many conventional notebooks, the notebook 100 may have a binding 102 that holds together the plurality of pages 104 and one or more covers 106. A user writes in the notebook 100 with a thermochromic ink writing utensil 110 (referred to generically herein as a "pen"). FIG. 1 shows the notebook 100 with notes written in thermochromic ink 108. After the user has written in the notebook 100, the user may erase the ink 108 using a liquid-diffused moisture carrier 120 (e.g., a wet cloth 120).

The inventors discovered and were surprised to find that moisture can erase thermochromic ink 108 when it is on synthetic paper 104 (e.g., using a wet cloth). This surprise was further enhanced given the durability and moisture-rich environments in which synthetic paper 104 may be used along with the seeming indelibility of thermochromic inks (in the absence of heat). It should be noted that the inventors are not privy to the actual chemical composition of the inks in the FRIXION™ thermochromic ink pen and therefore cannot describe, for example, why the ink is seemingly indelible on traditional paper but moisture-erasable or moisture-removable on synthetic paper.

The inventors suspect, but have not confirmed, that the mechanism of action for this erasure effect is because thermochromic ink is not absorbed into the synthetic paper 104. However, it should be understood that illustrative embodiments of the invention are intended to cover whatever mode of action is actually in use, and are not limited to the hypothesized mechanism of action.

It is hypothesized, as described in provisional application 62/421,335, that the thermochromic ink's pigment particles are sufficiently larger than any pores or imperfections on the surface of the synthetic paper. Thus, the ink pigment particles do not get stuck inside the pores or imperfections of the synthetic paper. In other words, the ink is not absorbed into the paper. Once the solvent of the ink evaporates, the thermochromic pigment is stuck to the surface of the page, but not trapped inside the pores of the page. The dry ink may appear to be permanently bonded to the synthetic page, but once the solvent, such as water is reintroduced, the ink is readily wiped away from the surface of the page. Accordingly, in some embodiments, the size of the thermochromic ink molecules and/or the microcapsule that encapsulates the thermochromic ink is larger than the pore size of the synthetic paper.

Tests were performed to confirm that the erasure effect was not caused by a change of temperature of the ink 108. Furthermore, the inventors determined that the thermochromic ink 108 is not completely moisture-erasable from cellulose-based paper. Conversely, non-thermochromic ink (e.g., tested from gel pens, ballpoint pens, dry-erase markers) is not completely and clearly moisture-erasable from synthetic paper.

Figure 2:
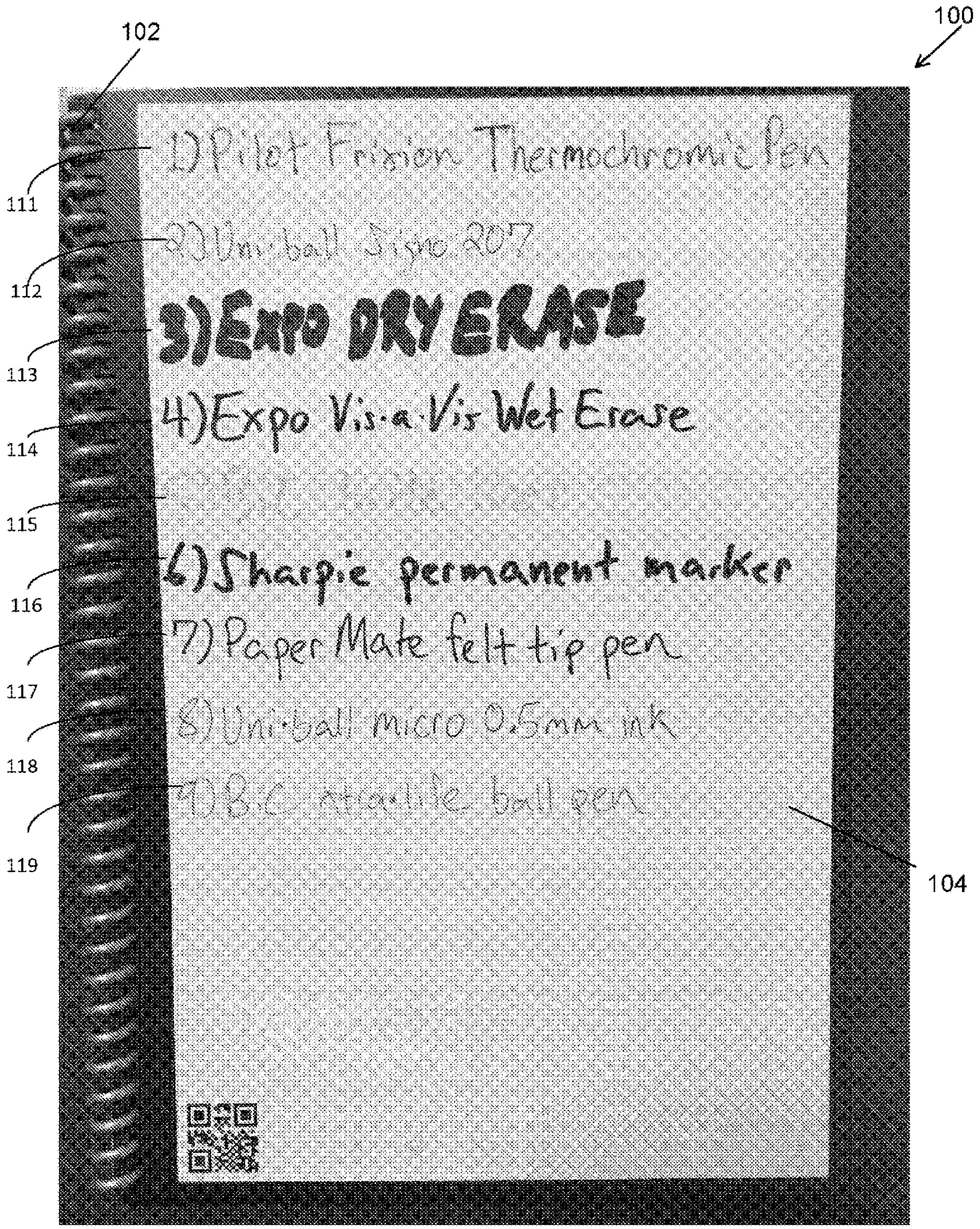
FIG. 2 is a picture of the notebook with markings from a variety of different writing utensils on the synthetic-paper page in accordance with illustrative embodiments of the invention.

FIG. 2 shows a picture of the notebook 100 with markings 111-119 from a variety of different writing utensils on the synthetic-paper page 104 in accordance with illustrative embodiments of the invention. Tests were performed with a number of writing utensils for comparison: Pilot Frixion thermochromic ink pen 111, a UniBall Signo 207 pen 112, an Expo dry erase marker 113, and Expo Vis-à-Vis wet-erase marker 114, a BiC brite liner highlighter 115, a Sharpie permanent marker 116, a Paper Mate felt tip pen 117, a UniBall micro 0.5 mm ink pen 118, and a BiC XtraLife ball pen 119. FIG. 2 shows the notebook 100 after the markings 111-119 were made on the page 104.

Figure 3:
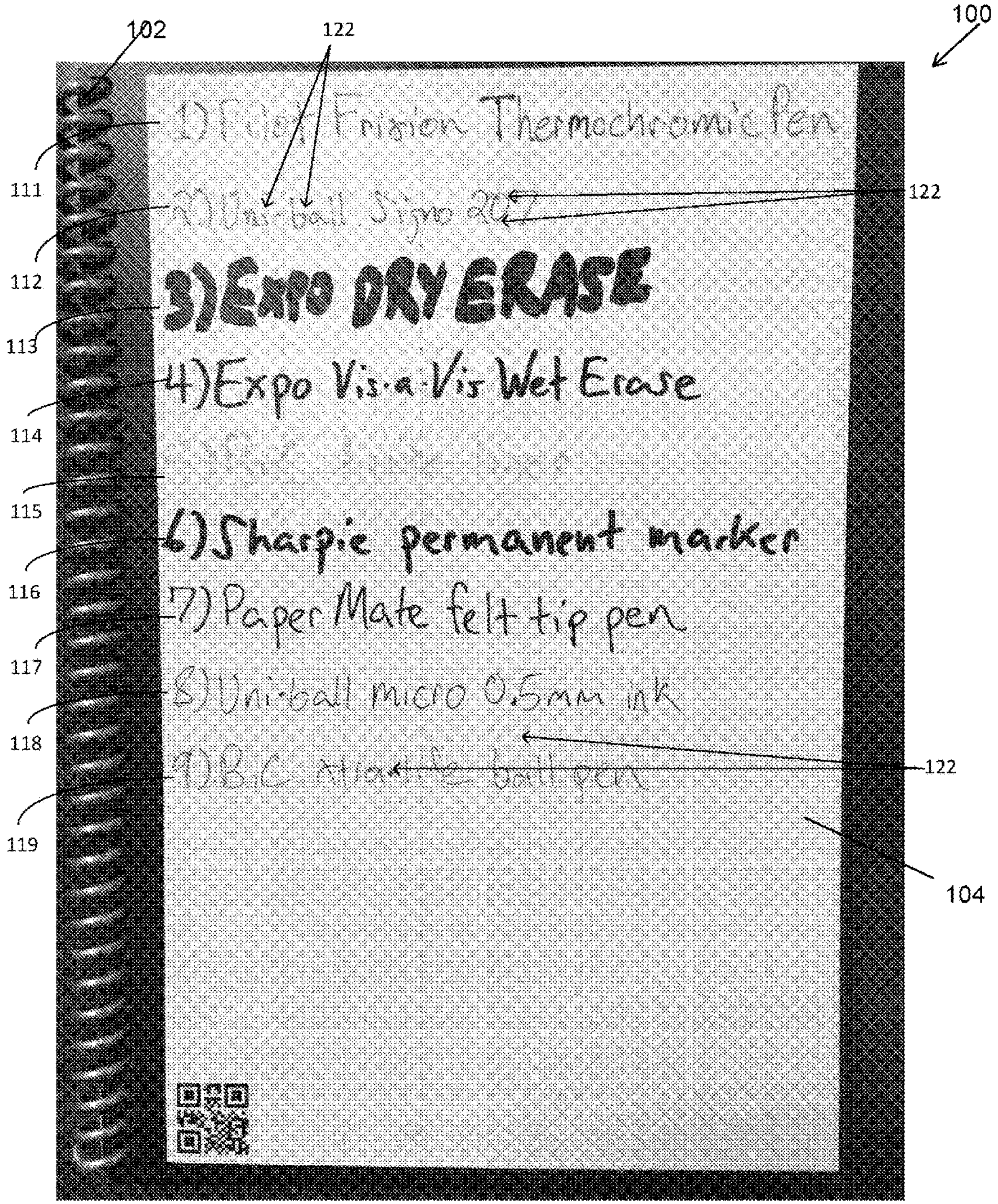
FIG. 3 is a picture of the notebook of FIG. 2 after the markings were dry rubbed in accordance with illustrative embodiments of the invention.

FIG. 3 shows a picture of the notebook 100 of FIG. 2 after the markings 111-119 were dry rubbed (e.g., running a finger and/or a dry napkin over the markings 111-119). Prior to dry rubbing the markings 111-119, they were allowed to dry for at least three minutes. The various markings 111-119 were dry rubbed to determine whether they would erase or smudge 122. Both the UniBall Signo 207 marking 112 and the BiC XtraLife ball pen marking 119 showed minimal signs of smudging 122 when compared to the original marking. However, none of the markings erased from the synthetic paper 104, even the Expo dry erase marking 113.

Figure 4:
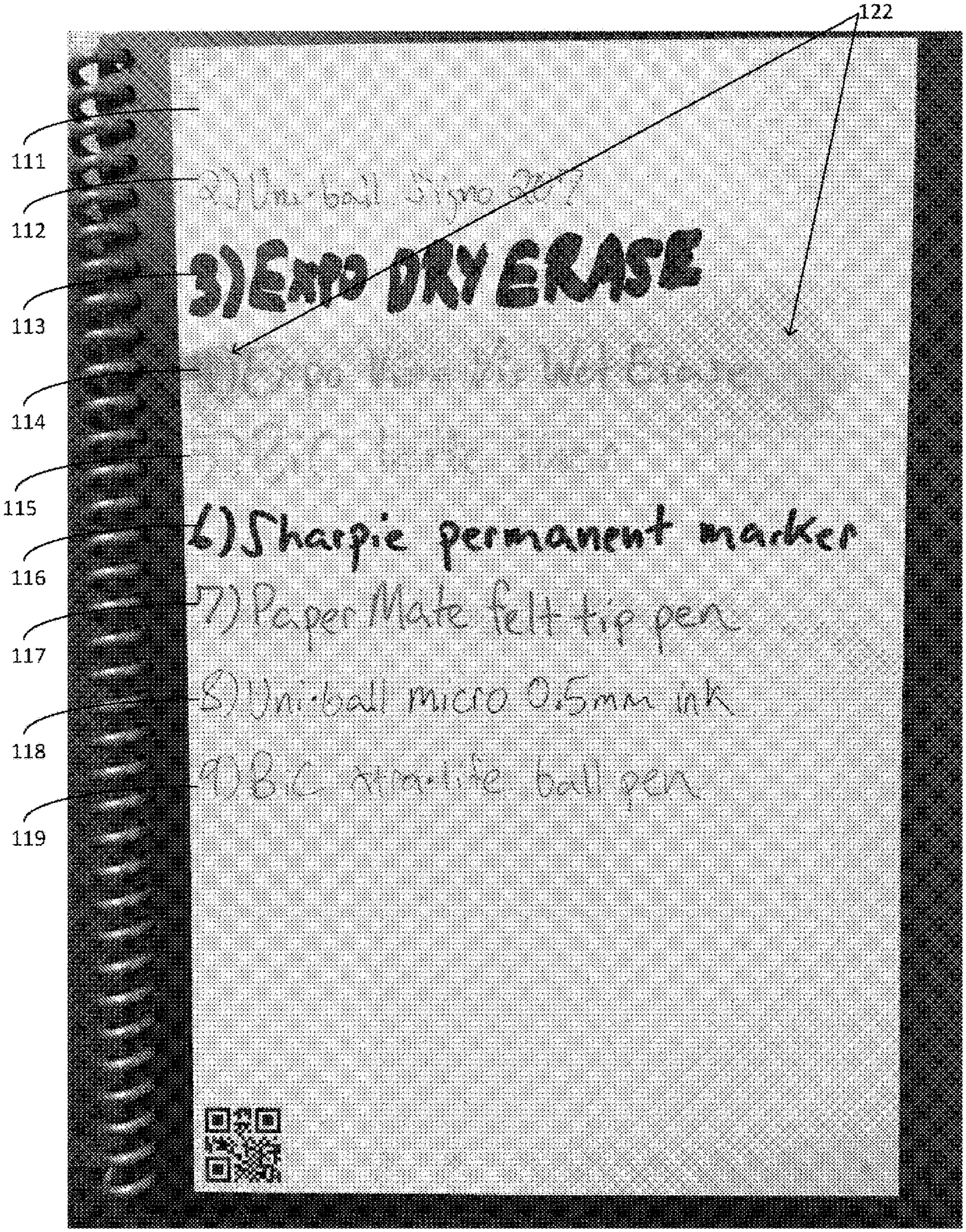
FIG. 4 is a picture of the notebook of FIG. 3 after the markings were wiped with water in accordance with illustrative embodiments of the invention.

FIG. 4 shows a picture of the notebook 100 of FIG. 3 after the markings 111-119 were wiped with water. Specifically, a soaked wet napkin was repeatedly run across all of the markings 111-119. As shown in the figure, only the thermochromic ink 111 was erased. The Expo Vis-à-Vis wet erase markings 114 were lightened, but produced considerable smudging 122. The lack of erasure and smudging 122 are undesirable properties for a reusable note taking system.

Figure 5A:
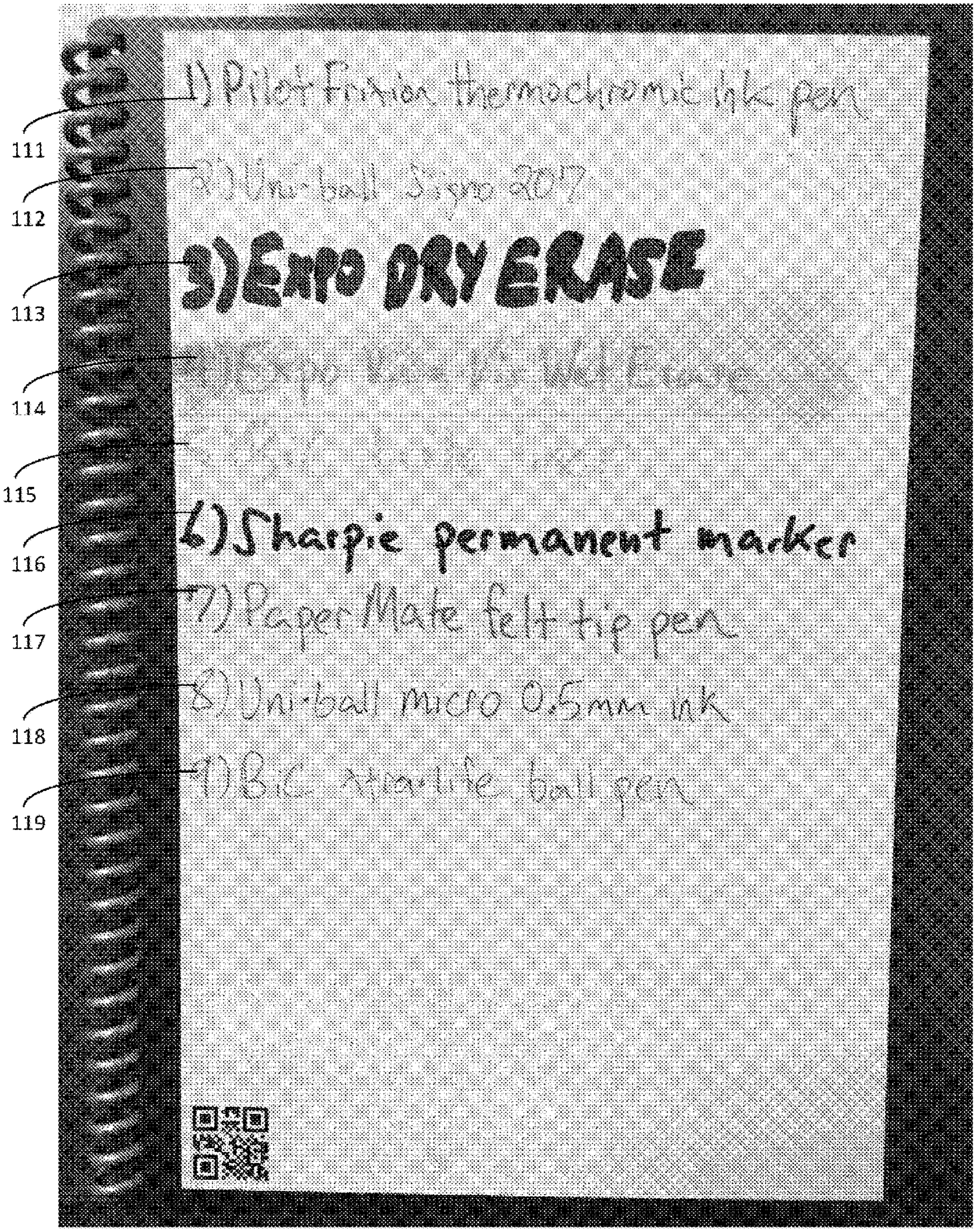
FIGS. 5A-5B are pictures of the notebook of FIG. 4 before and after the markings were wiped with 70% isopropyl alcohol, respectively, in accordance with illustrative embodiments of the invention.
Figure 5B:
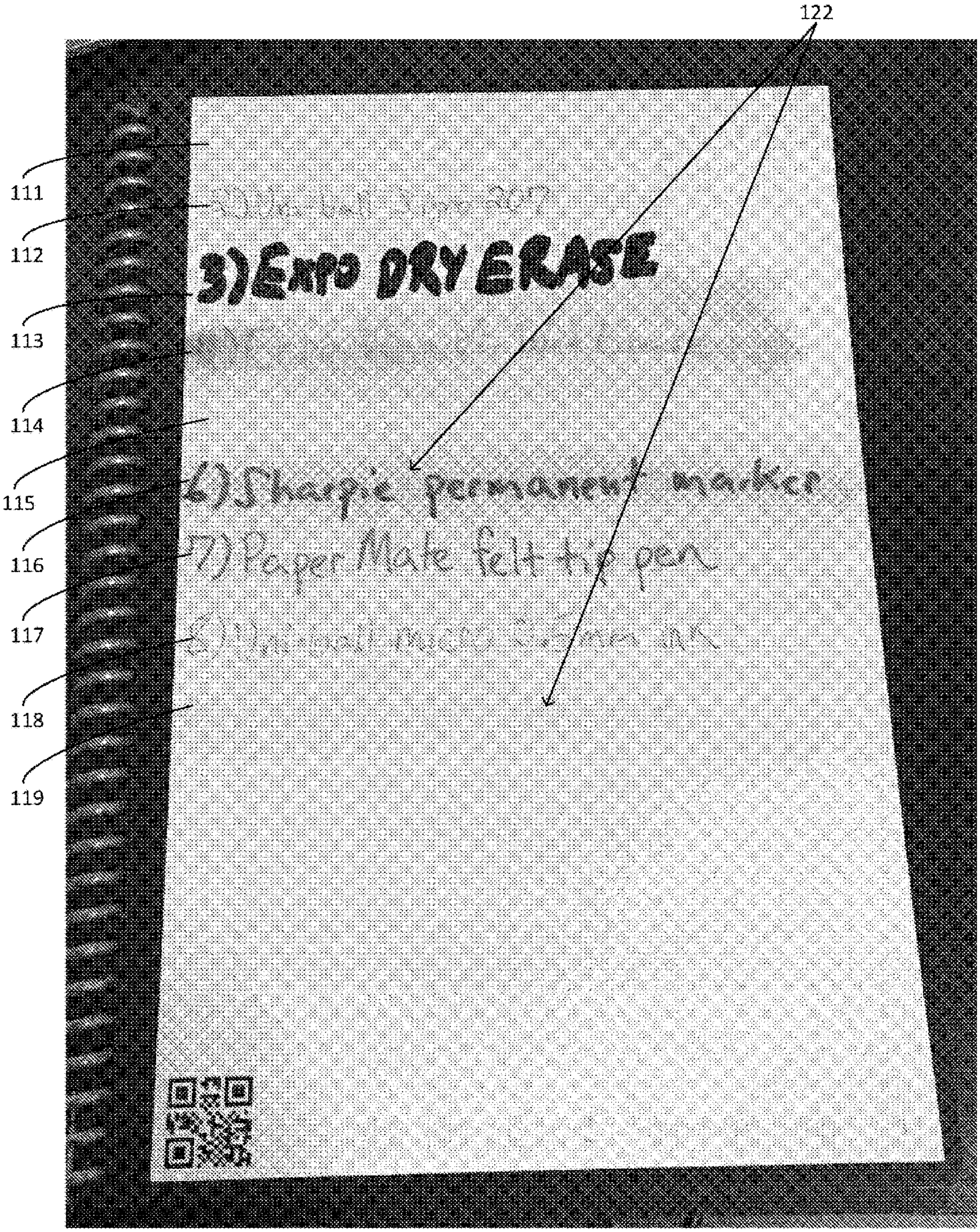

FIGS. 5A-5B show pictures of the notebook of FIG. 4 before and after the markings 111-119 were wiped with 70% isopropyl alcohol, respectively. FIG. 5A is a picture of the notebook of FIG. 4, except that thermochromic ink marking 111 was redrawn. Otherwise, the other markings 112-119 were left unchanged from FIG. 4. FIG. 5B shows the notebook of FIG. 5A after the page has been wiped with a 70% isopropyl alcohol wipe. As can be seen, the thermochromic ink marking 111, the BiC brite liner highlighter 115 marking, and the BiC XtraLife ball pen marking 119 were erased.

Both the Sharpie permanent marker markings 116 and the BiC XtraLife pen markings 119 left behind smudging 122 after being wiped with the alcohol wipes. Thus, only the thermochromic ink marking 111 and the BiC brite liner highlighter markings 115 erased without smudging. It should be noted that the thermochromic ink marking 111 was readily erasable (generally a single swipe with the moisture carrier is necessary), while the highlighter marking 115 required the application of considerable force and multiple swipes to erase significantly.

Figure 6A:
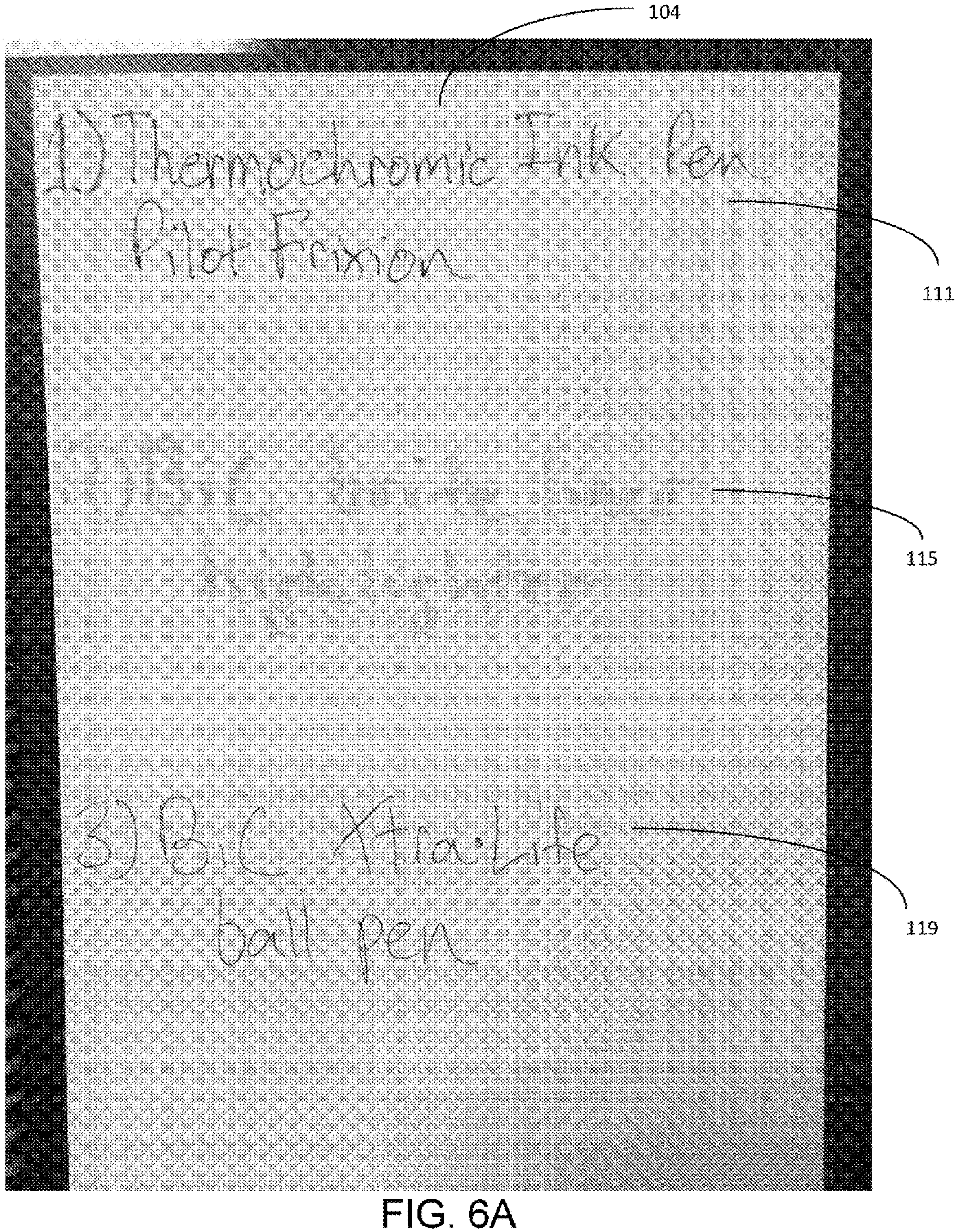
FIGS. 6A-6B are before and after pictures, respectively, of markings erased with water in accordance with illustrative embodiments of the invention.
Figure 6B:
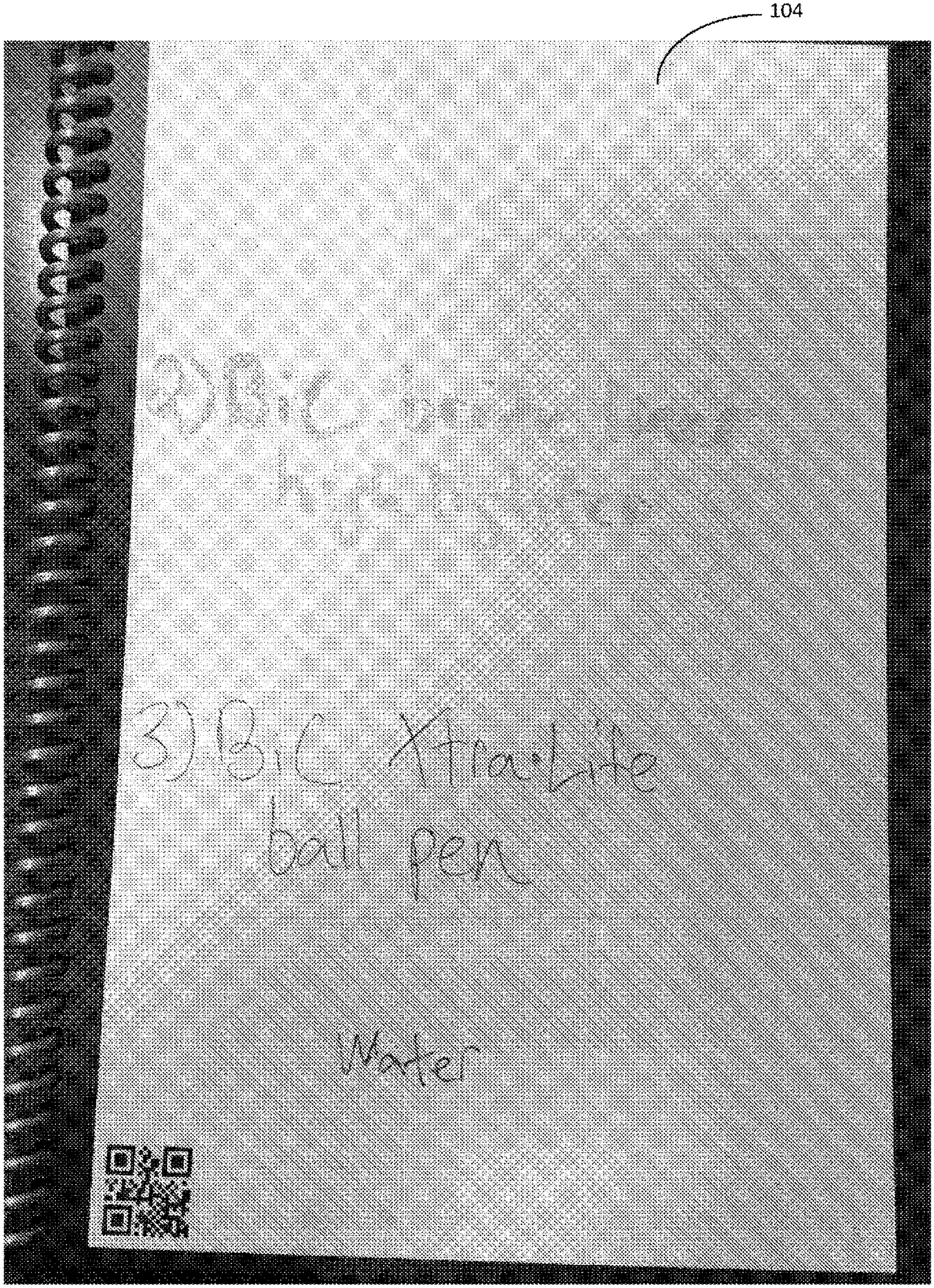
Figure 6C:
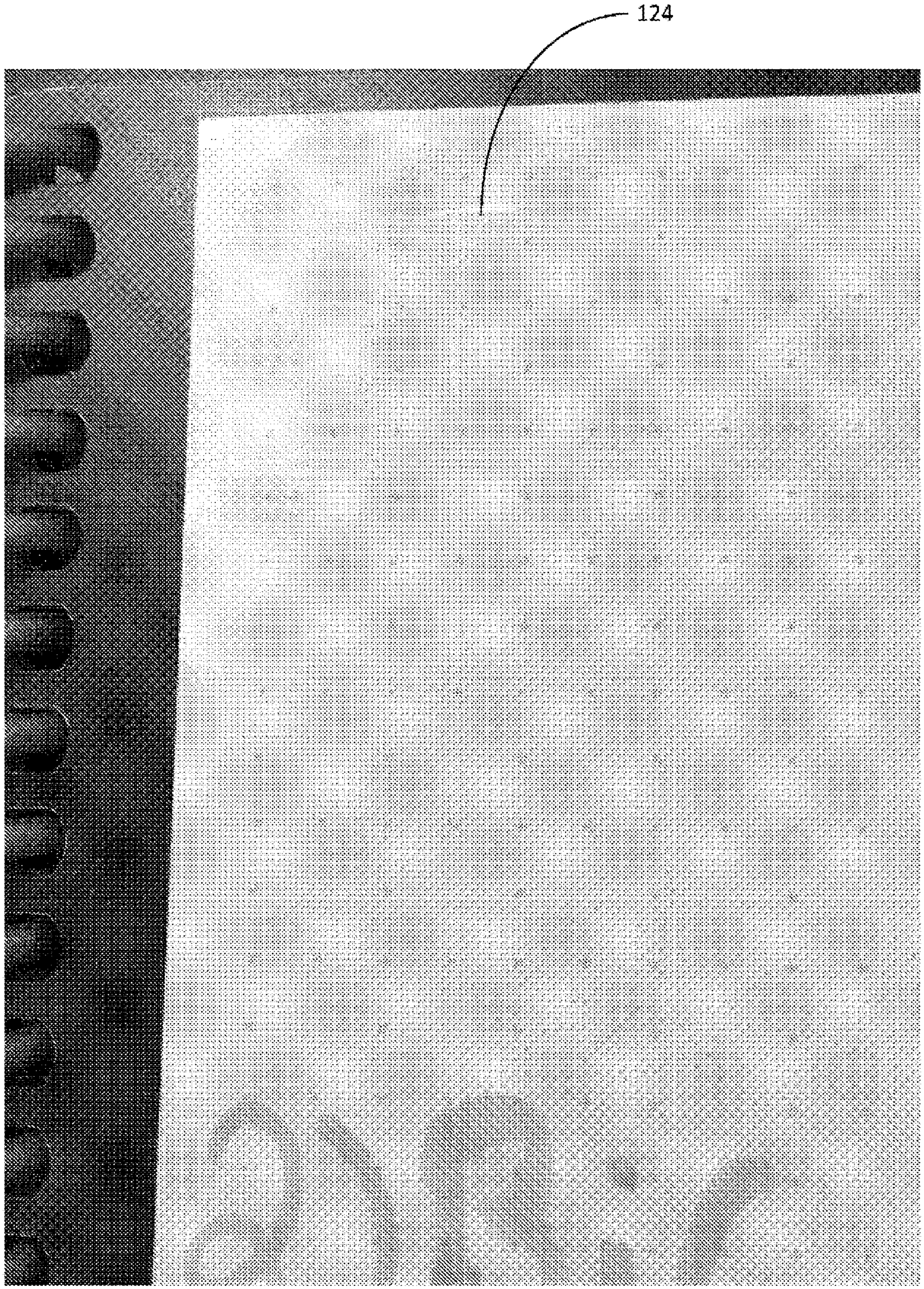
FIG. 6C is a close-up picture of FIG. 6B showing imprints left by the thermochromic ink pen in accordance with illustrative embodiments of the invention.

FIGS. 6A-6B are before and after pictures, respectively, of markings 111, 115, and 119 erased with water. As shown in FIG. 6A, the paper 104 has thermochromic ink markings 111, BiC brite liner highlighter markings 115, and BiC XtraLife pen markings 119. All three of these markings 111, 115, and 119 showed varying degrees of erasure with isopropyl alcohol wipes (see FIG. 5B). However, in FIG. 6B, it is clear that only the thermochromic ink markings 111 are erased with water. FIG. 6C is a close up picture of FIG. 6B. Although the markings 111 were erased, their imprint 124 can still be seen on the page 104. As defined in this application, a marking is considered to be "erased" even if it leaves behind an imprint 124 in the page 104.

Figure 7A:
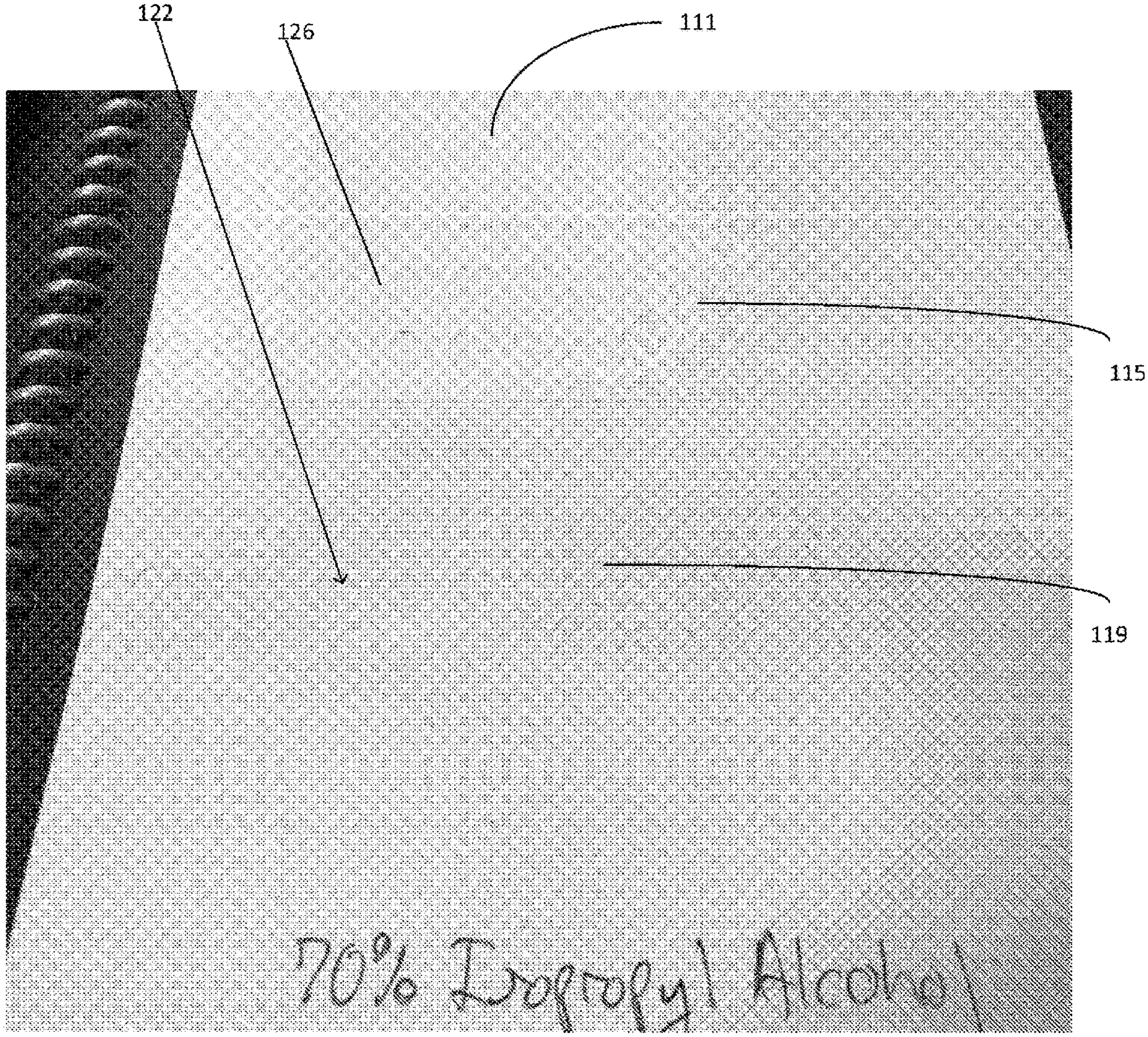
FIG. 7A is a picture of FIG. 6C erased with isopropyl alcohol in accordance with illustrative embodiment of the invention.
Figure 7B:
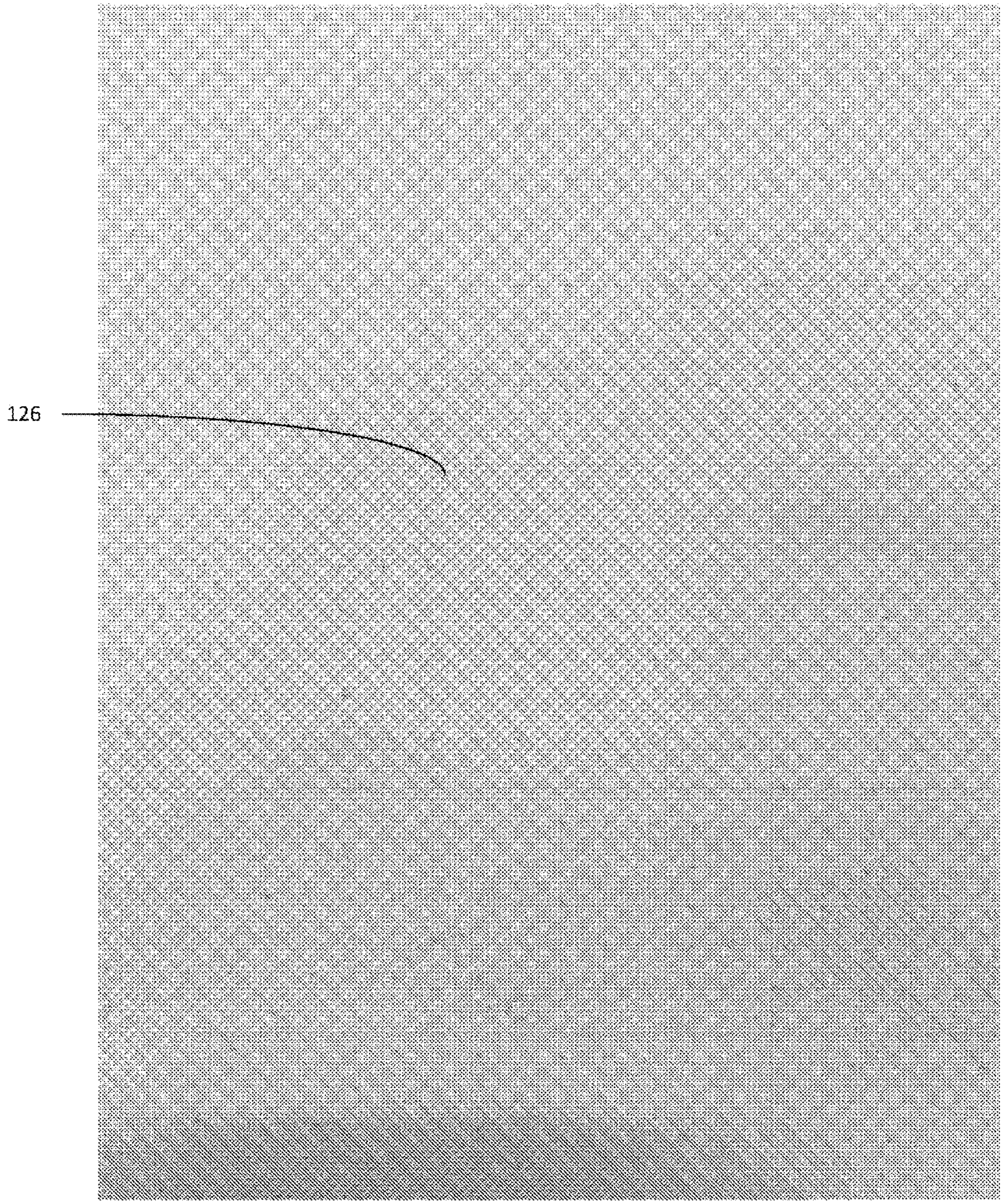
FIG. 7B is a close up of FIG. 7A after the page was scrubbed vigorously with an isopropyl alcohol wipe.

FIG. 7A is a picture of FIG. 6C erased with isopropyl alcohol. The figure shows that the BiC XtraLife pen markings 119 leave behind a smudge 122 that is unsuitable for reusable notebooks 100. A slight shadow 126 is left behind from the erasure of the highlighter marking 115. The thermochromic ink markings 111 were entirely erased. FIG. 7B is a close up of FIG. 7A after the page was scrubbed vigorously with an isopropyl alcohol wipe. Some of the dot-grid pattern on the page 104 was removed by vigorous rubbing with isopropyl alcohol wipes, exposing the base layer 126. In illustrative embodiments, erasing markings 111-119 does not remove the surface layer of the synthetic-paper (e.g., the layer containing the dot-grid pattern). In other words, in some embodiments, the base layer 126 is not exposed by the erasure process.

Figure 8:
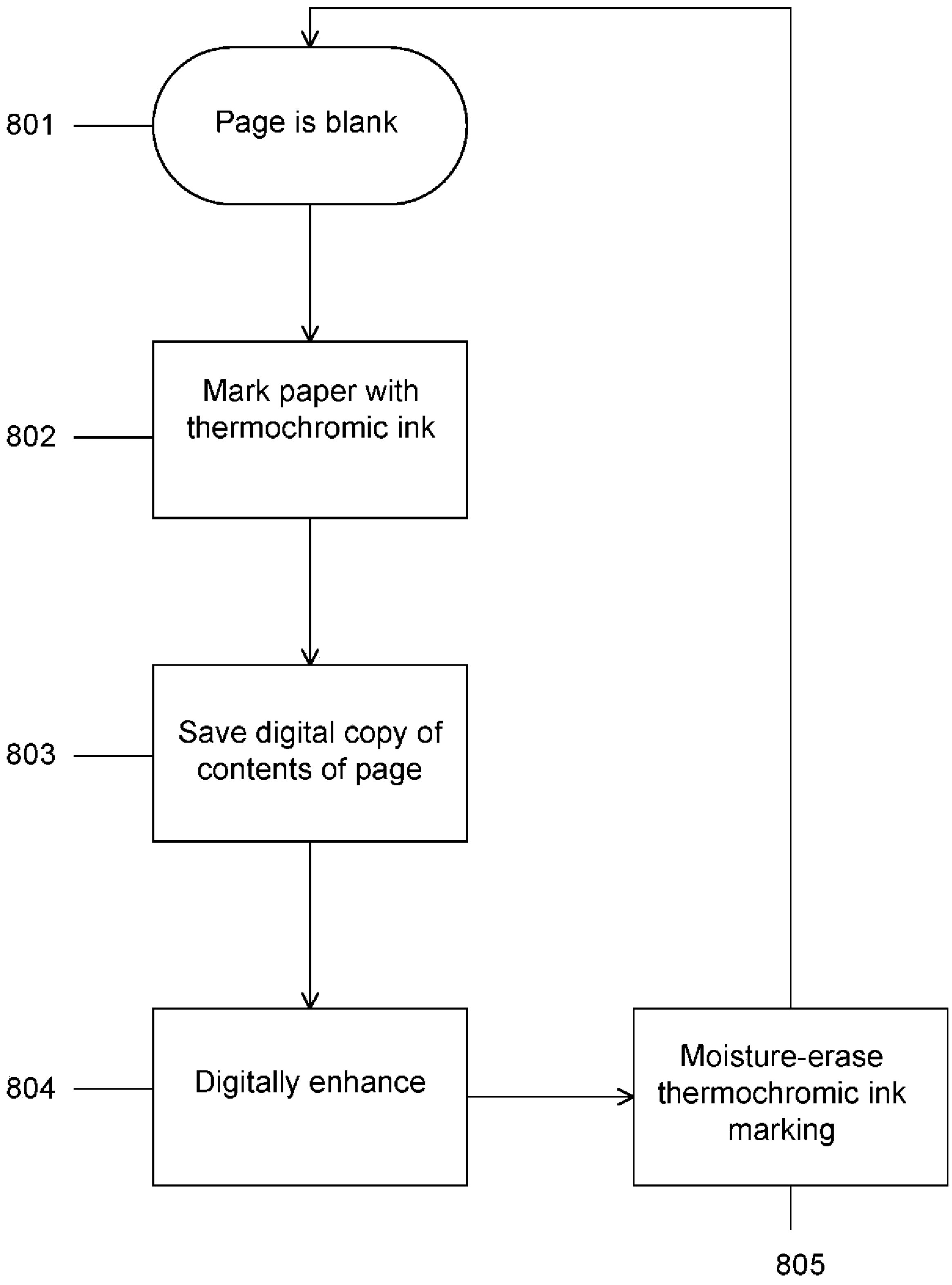
FIG. 8 schematically shows a process of using the notebook in accordance with illustrative embodiments of the invention.

FIG. 8 schematically shows a process of using the notebook in accordance with illustrative embodiments of the invention. The process begins with the presentation of blank pages 801. As mentioned above, pages may be referred to as paper without any intent to limit illustrative embodiments of the invention. The pages 104 can be any synthetic paper and/or waterproof paper from which thermochromic ink can be erased using a moistened moisture carrier as discussed herein. In illustrative embodiments, the synthetic pages 104 are Polyart®, Appvion Appleton Digital™, Parax™ stone paper, RockStock™ stone paper, Nekoosa™ XM, Nekoosa™ OM, HopSyn DL Grade®, and/or Yupo® FPG 80. The pages 104 may be water and/or moisture resistant (e.g., Nekoosa™ XM). Like many synthetic-paper pages, illustrative embodiments may have a base layer (e.g., comprising single-layered or multi-layered synthetic resin and/or plastic such as polypropylene) and an ink receptive layer (e.g., ground stone/calcium carbonate, clay, etc.), which is generally waterproof and helps the ink adhere to the page.

Content is written or printed on synthetic-paper with thermochromic ink at step 802. The thermochromic ink may include a Leuco dye that can change between colored and colorless forms. The Leuco dye can be Leuco 1, 2, 3, and/or 4. Furthermore, illustrative embodiments include color developer and color change temperature regulator in the thermochromic ink. In some embodiments, the thermochromic ink may be microencapsulated. Illustrative embodiments used Pilot FriXion ball-point gel pens, Pilot FriXion felt-tipped pens and markers, and/or the UniBall phantom.

As described above, the paper may be part of a bound notebook or the paper may be separate and loose. The marking is exposed to moisture 805 to return it to its original state so content can be written or printed on it again, which will be described further below. The process can be repeated multiple times. As expressed above, different moisture-erasing techniques can be employed to erase the marking.

Optionally, at step 803, the contents written on the originally blank paper can be saved with a digital scanner prior to heating the paper and clearing the contents. After the user writes on the paper with thermochromic ink, the paper can be scanned by a digital scanning process or by taking a digital photograph and performing digital signal processing on the digital photograph to capture and retain the content in a suitable format. For example; the digital content may be saved in a format such that OCR (optical character recognition) may occur for the digital content. Furthermore, at step 804, the digital photographs or scan may optionally undergo enhancement in a computer process for enhancing each image. These processes are described in U.S. patent application Ser. No. 15/211,462, filed Jul. 15, 2016, and in U.S. Provisional Patent Application No. 62/193,915, filed Jul. 17, 2015, herein incorporated by reference in their entireties. After the contents of the paper have been digitized and saved to an appropriate storage location, the markings can be erased.

The next step 805 in the process moisture erases the marking. As described above, in some embodiments, the notebook is wiped with a moisture carrier (e.g., a moist cloth, wet napkin, baby-wipe, etc.). In some embodiments, in order to reuse the reusable moisture-erasable notebook, the one or more pages 104 are water-proof, water-resistant, moisture-proof, and/or moisture-resistant (such as with previously described pages 104 Nekoosa™ XM, Nekoosa™ OM, etc.). A person of skill in the art understands that the different types of pages 104 described above are water-proof, water-resistant, moisture-proof and/or moisture-resistant. Additionally, or alternatively, the notebook may be heated to erase the thermochromic ink (e.g., microwaved).

It should be recognized that a notebook and thermochromic pen with instructions, or with the intent, for using the pen with the notebook and erasing the notebook using a moisture carrier may be sold together in the form of a packaged kit.

Illustrative embodiments of the present invention may be described, without limitation, by the above description. While these embodiments have been described in the clauses by process steps, an apparatus comprising a computer with associated display capable of executing the process steps in the clauses above is also included in the present invention. Likewise, a computer program product including computer executable instructions for executing the process steps in the clauses and stored on a computer readable medium is included within the present invention.

Advantages of the invention include that users may have the traditional feel of writing in a notebook without requiring the purchase of multiple notebooks. Furthermore, this system is environmentally-sustainable and does not require the destruction of trees.

Although the above discussion discloses various exemplary embodiments of the invention, it should be apparent that those skilled in the art can make various modifications that will achieve some of the advantages of the invention without departing from the true scope of the invention.

What is claimed is:

1. A method of reusing a notebook comprising: providing:
a notebook having at least one synthetic-paper page,
wherein the at least one synthetic-paper page comprises a base layer and an ink receptive layer which is waterproof,
a thermochromic ink pen which, when used to write on the at least one synthetic-paper page, leaves thermochromic ink markings;
wherein the thermochromic ink pen comprises a thermochromic ink comprising:
microcapsules including a leuco dye that can change between colored and colorless forms, and
water as a solvent, and
wherein the size of the microcapsules is larger than the pore size of the synthetic paper, and
a moisture carrier configured to have water diffused therein, the moisture carrier further configured to erase the thermochromic ink markings from the at least one synthetic-paper page by contacting the thermochromic ink markings when it is moist;
writing with thermochromic ink on at least a portion of the at least one synthetic-paper page; and
wiping the portion of the at least one synthetic-paper page having the thermochromic ink with the moist moisture carrier in which water is diffused such that the thermochromic ink is erased from the at least one synthetic-paper page.

2. The method of claim 1, wherein the base layer comprises single-layered or multi-layered synthetic resin and/or plastic.

3. The method of claim 1, wherein the ink receptive layer comprises ground stone, calcium carbonate, or clay.

4. A system comprising:
a notebook having at least one synthetic-paper page,
wherein the synthetic-paper page comprises a base layer and an ink receptive layer which is waterproof,
characterized by a thermochromic ink pen which, when used to write on the at least one synthetic-paper page, leaves thermochromic ink markings;
wherein the thermochromic ink pen comprises a thermochromic ink comprising:
microcapsules including a leuco dye that can change between colored and colorless forms, and
water as a solvent, and
wherein the size of the microcapsules is larger than the pore size of the synthetic paper such that the microencapsulated thermochromic ink can be erased from the at least one synthetic-paper page by wiping the thermochromic ink markings with a moisture carrier in which water is diffused.

5. The system of claim 4, wherein the base layer comprises single-layered or multi-layered synthetic resin and/or plastic.

6. The system of claim 4, wherein the ink receptive layer comprises ground stone, calcium carbonate, or clay.

7. The system of claim 4, wherein the moisture carrier is a cloth, a napkin, a sponge, a paper towel, or a wipe.

8. A method of reusing a notebook comprising: providing:
a notebook having at least one synthetic-paper page,
wherein the synthetic-paper page is water and/or moisture resistant and comprises a base layer and an ink receptive layer,
wherein the base layer comprises polyethylene, polypropylene, high-density polyethylene, polyester, or another plastic, and
wherein the ink receptive layer comprises ground stone, calcium carbonate, or clay;
a thermochromic ink pen comprising a thermochromic ink, wherein the thermochromic ink pen, when used to write on the at least one synthetic-paper page, leaves thermochromic ink markings; and
a moisture carrier configured to have water diffused therein and further configured to erase the thermochromic ink markings from the at least one synthetic-paper page by contacting the thermochromic ink markings when it is moist;
writing with thermochromic ink on at least a portion of the at least one synthetic-paper page; and wiping the portion of the at least one synthetic-paper page having the thermochromic ink with the moist moisture carrier in which water is diffused such that the thermochromic ink is erased from the at least one synthetic-paper page.

9. The method of claim 8, wherein the size of the microcapsules is larger than the pore size of the at least one synthetic paper page.

* * * * *